US012658185B2

(12) United States Patent
Jin et al.

(10) Patent No.: US 12,658,185 B2
(45) Date of Patent: *Jun. 16, 2026

(54) ELECTRONIC APPARATUS FOR GENERATING CAPTIONS AND CONTROL METHOD THEREOF

(71) Applicant: SAMSUNG ELECTRONICS CO., LTD., Suwon-si (KR)

(72) Inventors: Sichen Jin, Suwon-si (KR); Kwangyoun Kim, Seoul (KR); Sungsoo Kim, Suwon-si (KR); Junmo Park, Suwon-si (KR); Dhairya Sandhyana, Suwon-si (KR); Changwoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 257 days.

This patent is subject to a terminal disclaimer.

(21) Appl. No.: 18/392,369

(22) Filed: Dec. 21, 2023

(65) Prior Publication Data

US 2024/0127805 A1      Apr. 18, 2024

Related U.S. Application Data

(63) Continuation of application No. 17/430,614, filed as application No. PCT/KR2021/007818 on Jun. 22, 2021, now Pat. No. 11,893,980.

(30) Foreign Application Priority Data

Feb. 8, 2021    (WO) ........................ 10-2021-0017815

(51) Int. Cl.
*G10L 15/183* (2013.01)
*G06V 10/20* (2022.01)
(Continued)

(52) U.S. Cl.
CPC .......... *G10L 15/183* (2013.01); *G06V 10/255* (2022.01); *G10L 15/26* (2013.01); *H04N 21/4884* (2013.01)

(58) Field of Classification Search
CPC ........ G10L 15/22; G10L 15/26; G10L 15/183
See application file for complete search history.

(56) References Cited

U.S. PATENT DOCUMENTS 6,745,161 B1    6/2004  Arnold et al.
6,910,003 B1    6/2005  Arnold et al.
(Continued)

FOREIGN PATENT DOCUMENTS

EP    2 824 596 B1    10/2019
JP    6647141 B2    2/2020
(Continued)

OTHER PUBLICATIONS

Written Opinion (PCT/ISA/237) issued Oct. 27, 2021 by the International Searching Authority in International Application No. PCT/KR2021/007818.
(Continued)

*Primary Examiner* — Jialong He
(74) *Attorney, Agent, or Firm* — Sughrue Mion, PLLC

(57) ABSTRACT

An electronic apparatus and a control method thereof are provided. The electronic apparatus includes a communication interface configured to receive content comprising image data and speech data; a memory configured to store a language contextual model trained with relevance between words; a display; and a processor configured to: extract an object and a character included in the image data, identify an object name of the object and the character, generate a bias keyword list comprising an image-related word that is associated with the image data, based on the identified object name and the identified character, convert the speech data to (Continued)

a text based on the bias keyword list and the language contextual model, and control the display to display the text that is converted from the speech data, as a caption.

14 Claims, 9 Drawing Sheets

(51) Int. Cl.
　　G10L 15/26　　　　(2006.01)
　　H04N 21/488　　　(2011.01)

(56)　　　　　　References Cited

U.S. PATENT DOCUMENTS

| | | | |
|---|---|---|---|
| 7,599,554 B2 | 10/2009 | Agnihotri et al. | |
| 9,129,178 B2 | 9/2015 | Kim et al. | |
| 9,542,934 B2 | 1/2017 | Cooper et al. | |
| 10,573,312 B1 | 2/2020 | Thomson et al. | |
| 10,672,383 B1 | 6/2020 | Thomson et al. | |
| 10,971,153 B2 | 4/2021 | Thomson et al. | |
| 11,017,778 B1 | 5/2021 | Thomson et al. | |
| 11,145,312 B2 | 10/2021 | Thomson et al. | |
| 11,170,761 B2 | 11/2021 | Thomson et al. | |
| 11,594,221 B2 | 2/2023 | Thomson et al. | |
| 11,722,739 B2 | 8/2023 | Thomas | |
| 2007/0011012 A1* | 1/2007 | Yurick | G10L 15/26 |
| | | | 704/277 |
| 2007/0274385 A1* | 11/2007 | He | H04N 19/51 |
| | | | 375/E7.149 |

| | | | |
|---|---|---|---|
| 2011/0134321 A1* | 6/2011 | Berry | H04N 21/43074 |
| | | | 348/464 |
| 2013/0100347 A1* | 4/2013 | Zinovieva | G11B 27/031 |
| | | | 348/468 |
| 2014/0056522 A1 | 2/2014 | Kim et al. | |
| 2015/0106842 A1 | 4/2015 | Lee | |
| 2015/0271442 A1* | 9/2015 | Cronin | H04N 21/43072 |
| | | | 348/464 |
| 2019/0340469 A1 | 11/2019 | Su et al. | |

FOREIGN PATENT DOCUMENTS

| | | |
|---|---|---|
| KR | 10-2015-0043111 A | 4/2015 |
| KR | 10-1930940 B1 | 12/2018 |
| KR | 10-2019-0005651 A | 1/2019 |
| KR | 10-2013329 B1 | 8/2019 |
| KR | 10-2080315 B1 | 2/2020 |
| KR | 10-2020-0095947 A | 8/2020 |
| KR | 10-2020-0102309 A | 8/2020 |

OTHER PUBLICATIONS

International Search Report (PCT/ISA/210) issued Oct. 27, 2021 by the International Searching Authority in International Application No. PCT/KR2021/007818.

Pundak et al., "Deep Context: End-To-End Contextual Speech Recognition," arXiv:1808.02480v1, Aug. 7, 2018, total 8 pages.

Communication issued Feb. 5, 2025 by the Korean Intellectual Property Office in Korean Patent Application No. 10-2021-0017815.

* cited by examiner

Light-weight scene change detection $$MSE = \frac{1}{mn} \sum_{i=0}^{m-1} \sum_{j=0}^{n-1} \left[ \text{} - \text{} \right]^2$$

$$PSNR = 10 \cdot \log_{10}\left(\frac{MAX_1^2}{MSE}\right)$$

ELECTRONIC APPARATUS FOR GENERATING CAPTIONS AND CONTROL METHOD THEREOF

CROSS-REFERENCE TO RELATED APPLICATIONS

This application is a continuation application of U.S. patent application Ser. No. 17/430,614 filed on Aug. 12, 2021, which claims priority from International Patent Application No. PCT/KR2021/007818, filed on Jun. 22, 2021, and Korean Patent Application No. 10-2021-0017815, filed on Feb. 8, 2021, in the Korean Intellectual Property Office, the disclosures of which are incorporated herein by reference in their entireties.

TECHNICAL FIELD

This disclosure relates to an electronic apparatus and a control method thereof, and more particularly, to an electronic apparatus for displaying speech data of content as a caption and a control method thereof.

BACKGROUND ART

When an electronic apparatus reproduces content, an online captioning function may be supported for user's convenience. The online captioning refers to a function of generating and displaying a caption in real time when an arbitrary video is reproduced in an electronic apparatus such as a mobile phone or a television (TV). The video may be received and reproduced through an arbitrary path. Therefore, the electronic apparatus may not utilize metadata such as a title of a video or the like.

In addition, since an arbitrary video may be input to the electronic apparatus, the electronic apparatus should recognize speech (or voice) for various domains, but the domains are so diverse and it may be difficult to generate an individual language model for respective domains.

So, there is a need for a technology capable of recognizing a speech included in arbitrary content and displaying an accurate caption even without various language models.

DISCLOSURE

Technical Problem

One or more embodiments of the present disclosure provide an electronic apparatus for displaying an accurate caption using information included in content and a control method thereof.

Technical Solution

According to an aspect of the disclosure, there is provided an electronic apparatus including: a communication interface configured to receive content including image data and speech data; a memory configured to store a language contextual model trained with relevance between words; a display; and a processor configured to: extract an object and a character included in the image data, identify an object name of the object and the character, generate a bias keyword list including an image-related word that is associated with the image data, based on the identified object name and the identified character, convert the speech data to a text based on the bias keyword list and the language contextual model, and control the display to display the text that is converted from the speech data, as a caption.

The processor may be further configured to: recognize the speech data; identify, among the recognized speech data, a first word having a first similarity with the image-related word, the first similarity being greater than or equal to a preset value; identify a second word having a second similarity with a training word included in the trained language contextual model, the second similarity being less than the preset value; and convert the recognized speech data to the text based on the first word and the second word.

The processor may be further configured to: identify similarity between the identified object name and the identified character by modeling a relationship between the object name and the character; and generate the bias keyword list based on the similarity between the object name and the character.

The processor may be further configured to: classify the image-related word according to an occurrence frequency of the image-related word, and generate the bias keyword list by removing the image-related word having the occurrence frequency greater than or equal to a preset frequency.

The processor may be further configured to: based on a number of image-related words, which are associated with the image data and are included in the bias keyword list, exceeding a preset number, remove the image-related word according to a preset condition.

The preset condition for removing the image-related word may include at least one of the image-related word overlapping with an existing word, the image-related word having a similarity higher than a preset similarity, with a word included in the speech data, the image-related word is most recently added to the bias keyword list, or the image-related word occurring at a frequency lower than a preset frequency.

The processor may be configured to extract the object and the text from respective frames of the image data.

The processor may be further configured to extract a feature of the object and identify the object name based on the extracted feature of the object.

The processor may be further configured to, based on a peak signal to noise ratio (PSNR) of a frame of the image data exceeding a preset value, identify that a scene of the image data is changed.

According to an aspect of the disclosure, there is provided a control method of an electronic apparatus, the control method including: receiving content including image data and speech data; extracting an object and a character included in the image data; identifying an object name of the object and the character; generating a bias keyword list including an image-related word that is associated with the image data, based on the identified object name and the identified character; converting the speech data to a text based on the bias keyword list and a language contextual model trained with relevance between words; and displaying the text that is converted from the speech data, as a caption.

The converting the speech data to the text may include: recognizing the speech data; identifying, among the recognized speech data, a first word having a first similarity with the image-related word, the first similarity being greater than or equal to a preset value; identifying a second word having a second similarity with a training word included in the trained language contextual model, the second similarity being less than the preset value; and converting the recognized speech data to the text based on the first word and the second word.

The generating the bias keyword list may include: identifying similarity by modeling a relationship between the identified object name and the identified character; and generating the bias keyword list based on the similarity between the object name and the character.

The generating the bias keyword list may include classifying the image-related word according to an occurrence frequency of the image-related word; and generating the bias keyword list by removing the image-related word having the occurrence frequency greater than or equal to a preset frequency.

The generating the bias keyword list may include, based on the image-related word being included in the generated bias keyword list, exceeding a preset number, removing the image-related word according to a preset condition.

The preset condition for removing the image-related word may include at least one of the image-related word overlapping with an existing word, the image-related word having a similarity higher that a preset similarity with a word included in the speech data, the image-related word is most recently added to the bias keyword list, or the image-related word occurring at a frequency lower than a preset frequency.

DESCRIPTION OF DRAWINGS

The above and other aspects, features, and advantages of certain embodiments of the present disclosure will be more apparent from the following description taken in conjunction with the accompanying drawings, in which:

FIG. 5 is a diagram illustrating a process of identifying change of a scene according to an embodiment;

MODE FOR CARRYING OUT THE INVENTION

Figure 1:
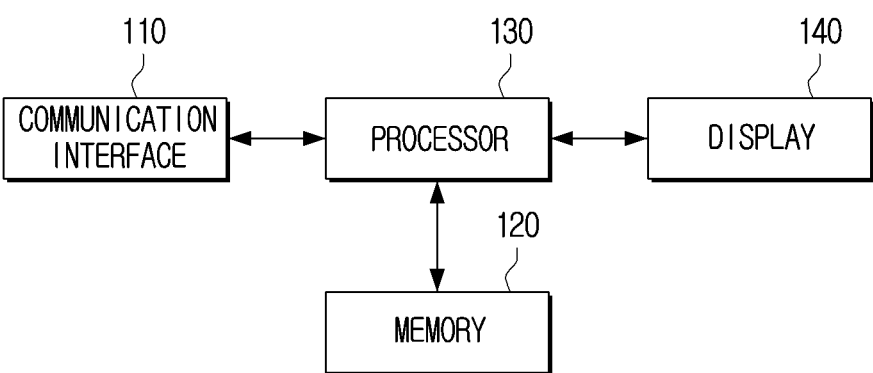
FIG. 1 is a block diagram illustrating a configuration of an electronic apparatus according to an embodiment.

Hereinafter, various embodiments will be described in detail with reference to the accompanying drawings. The embodiments described herein may be variously modified. Certain embodiments may be described in the drawings and depicted in detail in the detailed description. However, the specific embodiments disclosed in the accompanying drawings are for ease of understanding various embodiments. Accordingly, it is to be understood that the disclosure is not limited to the specific embodiments in the accompanying drawings, and it is to be understood that all equivalents or alternatives included within the spirit and scope of the disclosure are included.

In the description, the terms "first, second, and so forth" are used to describe diverse elements regardless of their order and/or importance and to discriminate one element from other elements, but are not limited to the corresponding elements.

In this disclosure, the terms "comprises" or "having" and the like are used to specify that there is a feature, number, step, operation, element, part or combination thereof described in the specification, but do not preclude the presence or addition of one or more other features, numbers, steps, operations, elements, parts, or combinations thereof. It is to be understood that when an element is referred to as being "coupled" or "connected" to another element, it may be directly coupled or connected to the other element, or any other element may be interposed therebetween. In the meantime, when an element is referred to as being "directly coupled" or "directly connected" to another element, it should be understood that no other element is present therebetween.

In the disclosure, a "module" or a "~er/~or" may perform at least one function or operation, and be implemented by hardware or software or be implemented by a combination of hardware and software. In addition, a plurality of "modules" or a plurality of "~ers/~ors" may be integrated in at least one module and be implemented by at least one processor (not illustrated) except for a "module" or a "~er/or" that needs to be implemented by specific hardware. Singular forms are intended to include plural forms unless the context clearly indicates otherwise.

In the description of the disclosure, the order of each step should be understood non-restrictively unless a preceding step must be performed before a subsequent step logically and temporally. That is, except for the exceptional case above, although a process described as a subsequent step is performed before a process described as a preceding step, it does not affect the essence of the disclosure and the scope of the disclosure should be defined regardless of order of steps. Also, description of "A or B" is defined to mean that both A and B are included, as well as selectively indicating any one of A and B. Also, the term "including" in this specification has a comprehensive meaning to further include another component in addition to elements enumerated to be included.

In this specification, only essential components necessary for the description of the disclosure are described and components not related to the essence of the disclosure are not mentioned. Also, only the mentioned components should not be construed to be included in an exclusive sense but should be construed in a non-exclusive sense to include any other component.

When it is decided that a detailed description for the known art related to the disclosure may unnecessarily obscure the gist of the disclosure, the detailed description may be shortened or omitted. Each embodiment may be implemented or operated independently, or each embodiment may be implemented or operated in combination.

FIG. 1 is a block diagram illustrating a configuration of an electronic apparatus according to an embodiment.

Referring to FIG. 1, an electronic apparatus 100 includes a communication interface 110, a memory 120, a processor 130, and a display 140. For example, the electronic apparatus 100 may include a smartphone, a tablet personal computer (PC), a navigation, a slate PC, a wearable device, a digital television (TV), a desktop computer, a laptop computer, a kiosk, or the like.

The communication interface 110 communicates with an external device. The communication interface 110 may receive content under the control of the processor 130. The content includes image data and speech data. The image data may include static image data and dynamic image data. The dynamic image data may include a video. The communication interface 110 may receive content including image data and speech data.

For example, the communication interface 110 may include a module capable of communicating by a method such as 3$^{rd}$ generation (3G), long term evolution (LTE), 5$^{th}$ generation (5G), Wi-Fi, Bluetooth, digital multimedia broadcasting (DMB), advanced television systems committee (ATSC), digital video broadcasting (DVB), local area network (LAN), ZigBee, beacon, infrared communication, and the like. The communication interface 110 may also include a communication port. The communication interface 110 may receive content via the communication port. For example, the communication port may include a port such as a high-definition multimedia interface (HDMI), display port (DP), a red-green-blue (RGB), a digital visual interface (DVI), a universal serial bus (USB), Thunderbolt, a local area network (LAN), or the like. An external device may include an audio-video (AV) broadcast receiver, a set-top box, a web server, a cloud, and the like. A communication interface for communicating with an external device may be referred to as a communication unit, a communication module, a transceiver, or the like.

The memory 120 may store data and algorithms for performing the functions of the electronic apparatus 100, and may store programs, instructions, and the like running in the electronic apparatus 100. The memory 120 may recognize a speech from image data and speech data included in the received content, and may store an algorithm for displaying the recognized speech as a caption. The caption display algorithm stored in the memory 120 may be loaded into the processor 130 by the control of the processor 130 to display the caption. The memory 120 may store a trained language contextual model. The language contextual model may be a model trained for words, similarity, relevance, etc. between words through a learning machine. The memory 120 may store a generated bias keyword list. For example, the memory 120 may be implemented with a read-only memory (ROM), a random access memory (RAM), a hard disk drive (HDD), a solid state drive (SSD) memory, a memory card, or the like.

The processor 130 may control respective configurations of the electronic apparatus 100. For example, the processor 130 controls the communication interface 110 to receive content. The processor 130 may control the display 140 to display the caption based on the information extracted from the image data included in the received content and the speech recognized from the speech data.

The processor 130 may extract an object and a character included in the image data, and may identify a name of the extracted object and the character. The processor 130 may extract objects and characters from each frame of image data. The object may correspond to an inanimate object or a living object such as a human. The processor 130 may extract features from the extracted object and identify the name of the object based on the extracted feature.

The processor 130 may generate a bias keyword list that includes a word associated with the image data based on the identified name of the object and the character. The bias keyword list may be a list including words associated with content, rather than a general word. A general word may be easily recognized from a universally trained language contextual model. However, words frequently appearing only in certain content, such as a human name, a team name, etc., may be difficult to be recognized from a universally trained language contextual model. For example, if a word "pattern" is included in the speech data of the content, the language contextual model of the electronic apparatus 100 may easily identify "pattern." If the electronic apparatus 100 recognizes the character "pat", the electronic apparatus 100 may predict the word "pattern". However, if the word "patrick" is included in the speech data of the content, the language contextual model is likely to predict a wrong word, such as "pattern" rather than "patrick." Accordingly, the disclosure is to generate a bias keyword list including a word extracted from image data, and to supplement a trained language contextual model based on the generated bias keyword list.

The processor 130 may identify similarity by modeling a relationship between the identified name of the object and the identified character. The identified name of the object and character may be a word associated with image data. The processor 130 may classify a word associated with the image data according to an occurrence frequency of the word, and the processor 130 may remove the word associated with the image data having a frequency greater than or equal to a preset frequency and generate the bias keyword list. The electronic apparatus 100 should process data quickly to recognize speech from the image data and speech data in real time and display the data as a caption. If the number of words included in the bias keyword list is large, it is necessary to maintain the word in the bias keyword list below or equal to a predetermined number because it is difficult for the processor 130 to process the words quickly. Since a word with a predetermined frequency or more is a frequently appearing word and the processor 130 may easily recognize the word. The processor 130 may remove a word with a frequency greater than or equal to a predetermined frequency and may generate a bias keyword list.

The processor 130 may extract a word related to the image data for respective frames of the content and add the extracted word to the bias keyword list. If the processor 130 continues to add words to the bias keyword list, there may be a lot of words included in the bias keyword list. Accordingly, when the number of words associated with the image data included in the generated bias keyword list exceeds a predetermined number, the processor 130 may remove words included in the bias keyword list according to a predetermined condition. For example, the preset condition for removing a word from the bias keyword list may include at least one of a word associated with the image data overlapping with an existing word, a word associated with the image data having a high similarity with the word included in the speech data, a word associated with the image data that is most recently added to the bias keyword, or a word associated with the image data having a low frequency.

Through the above-described process, the processor 130 may extract a word associated with the image data from the image data and may generate a bias keyword list. The processor 130 may convert speech data included in the content into text based on the generated bias keyword list and the trained language contextual model. For example, the processor 130 may recognize speech data. The processor 130 may identify words of which similarity with the words included in the bias keyword list is greater than or equal to a preset value, among the recognized speech data, as words included in the bias keyword list. Alternatively, the processor 130 may identify words of which similarity is less than a predetermined value as words included in the trained language contextual model. The processor 130 may identify a word using the bias keyword list and the trained language contextual model, and may convert the recognized speech data into text based on the identified word. The processor 130 may control the display 140 to display the converted speech data as a caption.

The content may be a video including speech data and image data. The video may have a completely changed scene. The processor 130 may identify that a scene of the image data has changed when a peak signal to noise ratio (PSNR) of a frame of the image data exceeds a predetermined value.

The display 140 may output an image signal for which image processing is performed. The display 140 may display the speech data converted into text along with the image data of the content as a caption. For example, the display 140 may be implemented as a liquid crystal display (LCD), an organic light emitting diode (OLED), a flexible display, a touch screen, and the like. When the display 140 is implemented as a touch screen, the display apparatus 100 may receive a control command through the touch screen.

Figure 2:
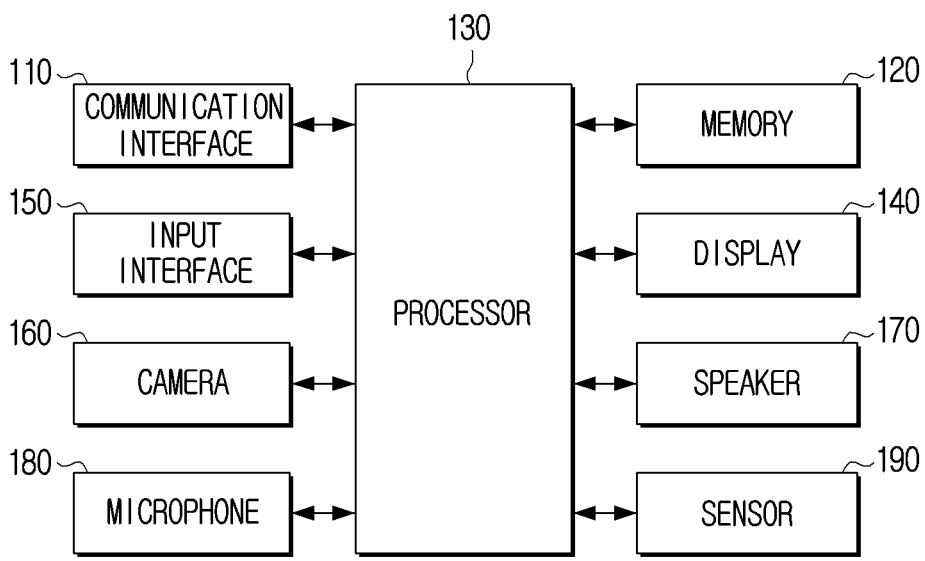
FIG. 2 is a block diagram illustrating a specific configuration of an electronic apparatus according to an embodiment.

FIG. 2 is a block diagram illustrating a specific configuration of an electronic apparatus according to an embodiment.

Referring to FIG. 2, the electronic apparatus 100 may include the communication interface 110, the memory 120, the processor 130, the display 140, an input interface 150, a camera 160, a speaker 170, a microphone 180, and a sensor 190. Since the communication interface 110, the memory 120, and the display 140 are configured substantially the same as those described in FIG. 1, a detailed description thereof will be omitted.

The input interface 150 may receive a control command from a user. For example, the input interface 150 may be implemented as a keypad, a touch pad, or the like. The input interface 150 may function to receive a command from a user and may be referred to as an inputter, an input unit, an input module, or the like.

The input interface 150 may be implemented as the display 140, the camera 160, the microphone 180, or the sensor 190, in addition to the key pad and the touch pad described above. For example, when the display 140 is implemented as a touch screen, the electronic apparatus 100 may receive a control command via the touch screen. When the input interface 150 is implemented with the camera 160, the electronic apparatus 100 may capture facial expression, action, or the like, of a user. The processor 130 may recognize a control command based on a captured facial expression or action. When the input interface 150 is implemented as a microphone 180, the electronic apparatus 100 may receive a user's speech. The processor 130 may recognize a control command based on the inputted voice. When the input interface 150 is implemented with the sensor 190, the sensor 190 may receive a signal or the like from an external device, such as a user's action or a remote controller. The processor 130 may recognize a control command based on the inputted action or a signal of the user.

The camera 160 may capture a surrounding environment. The camera 160 may capture a facial expression or action, or the like, of the user. The processor 130 may recognize a control command based on a user's facial expression or action, and may perform a control operation corresponding to the recognized control command. For example, the camera 160 may include a sensor such as a charge-coupled device (CCD) or a complementary metal-oxide semiconductor (CMOS). The camera 160 may include a red/green/blue (RGB) camera, a depth camera, or the like.

The speaker 170 may output a sound signal in which sound processing is performed. For example, the speaker 170 may output audio data included in the content. The speaker 170 may output a user's input command of the user, state-related information of the electronic apparatus 100, or operation-related information, as speech or alarm sound.

The microphone 180 may receive an audio signal. The microphone 180 may obtain an audio signal from a user located within a predetermined distance under the control of the processor 130. The electronic apparatus 100 may include a plurality of microphones. When the electronic apparatus 100 includes a plurality of microphones, the processor 130 may identify the location of the sound source based on the direction, size, phase, etc. of the audio signal obtained from the plurality of microphones. The microphone 180 may receive a user's speech. The processor 130 may recognize a control command based on the inputted speech and perform a control operation corresponding to the recognized control command.

The sensor 190 may sense the state around the electronic apparatus 100. The processor 130 may recognize a control command based on the sensed signal and perform a control operation corresponding to the recognized control command. For example, the sensor 190 may include an acceleration sensor, a gravity sensor, a gyro sensor, a geomagnetic sensor, a direction sensor, a motion recognition sensor, a proximity sensor, a voltmeter, an amperemeter, a barometer, a hygrometer, a thermometer, an illuminance sensor, a thermal sensor, a touch sensor, an infrared sensor, an ultrasonic sensor, and the like. When the processor 130 identifies the position of the object based on the information obtained through the camera 160 and the microphone 180, the camera 160 or the microphone 180 may also be referred to as the sensor 190.

The electronic apparatus 100 may include all of the above-described configurations and may include some configurations. In addition, the electronic apparatus 100 may further include other configurations that perform various functions in addition to the above-described configuration.

The configurations of the electronic apparatus have been described. A specific process of displaying a caption by the electronic apparatus will be described.

Figure 3:
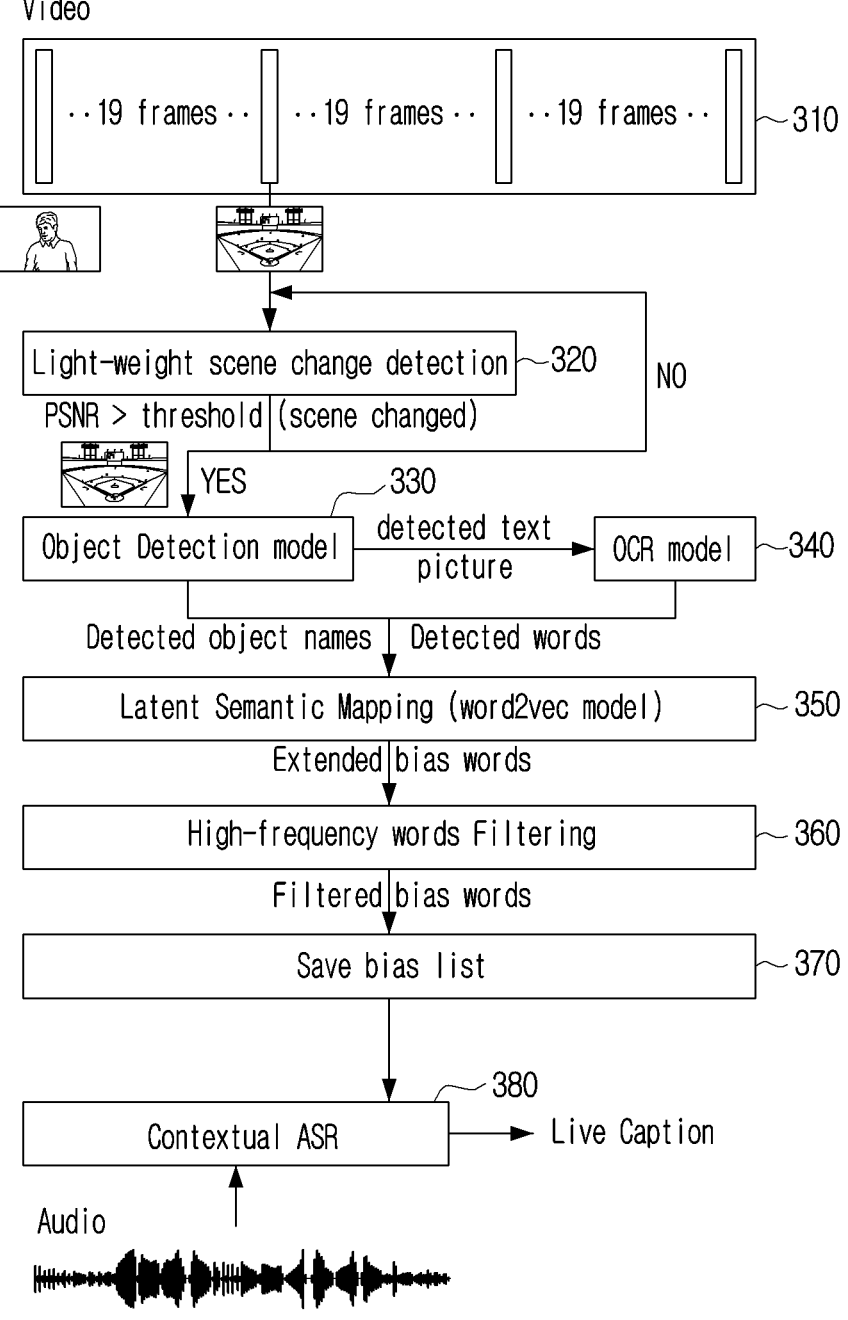
FIG. 3 is a diagram illustrating an operation of an electronic apparatus according to an embodiment.
Figure 4:
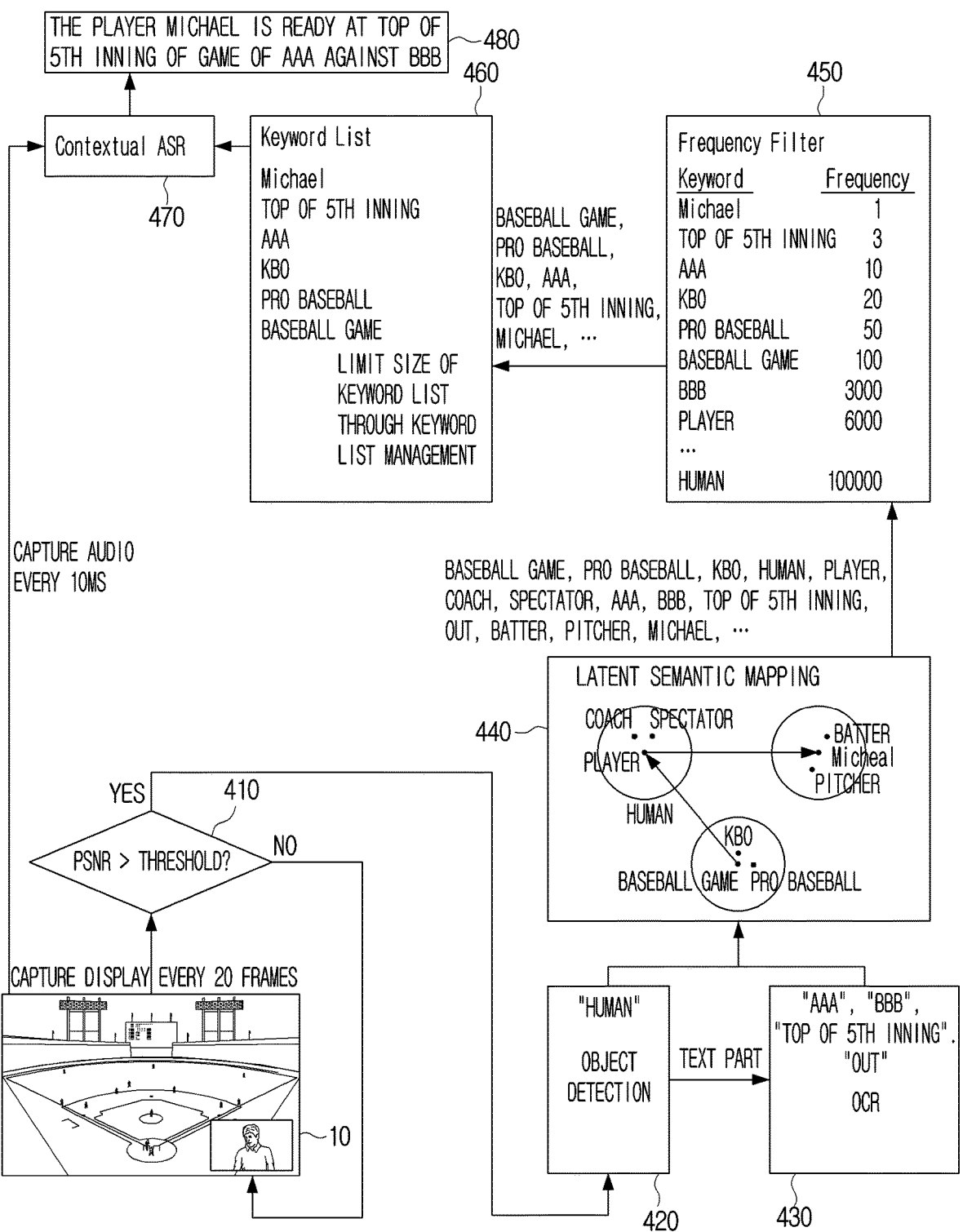
FIG. 4 is a diagram illustrating a process of displaying a caption according to an embodiment.

FIG. 3 is a diagram illustrating an operation of an electronic apparatus according to an embodiment; FIG. 4 is a diagram illustrating a process of displaying a caption according to an embodiment. The disclosure will be described with reference to FIGS. 3 and 4.

Referring to FIGS. 3 and 4, the electronic apparatus may receive content (operation 310). For example, the content may be a video and may include image data and speech data. The electronic apparatus may capture a frame of image data 10 at a predetermined period and may identify whether to change a scene (operation 320). For example, the electronic apparatus may capture image data at 20 frame intervals. In one embodiment, the content may be a baseball game broadcast and the captured image data 10 may be a baseball game scene. The electronic apparatus may compare a predetermined threshold value with the PSNR of the captured frame (operation 410). If the PSNR of the captured frame exceeds a threshold value, the electronic apparatus may identify that the scene has been changed.

The electronic apparatus may detect an object and a character included in the frame for every frame of a changed scene (operation 420). For example, the electronic apparatus may detect an object and a character by using a trained object detection model (operation 330). The electronic apparatus may extract features from the detected object and identify the name of the object based on the extracted feature. The electronic apparatus may identify the detected character by using an optical character reader (OCR) model (operations 340, 430). In one embodiment, a character such as AAA team, BBB team, top of the 5$^{th}$ inning, Out, or the like, along with a baseball player may be included in a frame of image data. The electronic apparatus may extract features from an object of a baseball player and may identify a name of a baseball player that is Michael from the extracted feature. The electronic apparatus may identify a character such as AAA, BBB, the top of 5$^{th}$ inning, Out, or the like, using a scheme such as an optical character reader (OCR).

The electronic apparatus may perform a latent semantic mapping based on the identified name of the object and the identified character (operations 350, 440). The identified name of the object and the identified character may be words associated with the image data. The latent semantic mapping means inference of similarity (and relevance) by transforming respective words into a vector, and gathering the near words based on the transformed vector. The electronic apparatus may identify the similarity by modelling the relationship between the identified character (words related to image data) and the name of the identified object. In one embodiment, the electronic apparatus may identify Korea Baseball Organization (KBO) as a similar word as a baseball game, a pro baseball based on the name and character of the identified object, identify the BBB team as a pro baseball team, and identify Michael as a baseball player.

The electronic apparatus may classify the words with the identified similarity according to the frequency, and may remove the words having a preset frequency or more (operations 360, 450). The electronic apparatus may generate a list of bias keywords using the words with identified similarity. The electronic apparatus uses the generated bias keyword list to display the speech data as a caption. As described above, when the content is a video, the caption should be displayed together with the image of the video in real time, the electronic apparatus needs to perform speed recognition and text conversion on the speech data quickly. The bias keyword list may have a size which is less than or equal to a predetermined size. The electronic apparatus may maintain the bias keyword list to have a file size below or equal to a predetermined size by removing a frequently occurring word from the bias keyword list. For example, as shown in FIG. 4, if a preset frequency of the electronic apparatus is set to 1000, a word, such as BBB, player, etc., may be removed. A bias keyword list may be generated by including words such as Michael, the top of 5$^{th}$ inning, AAA, KBO, or the like, of which frequency is 1000 or below, in the bias keyword list (operation 460). The electronic apparatus may, based on a number of words associated with the image data included in the generated bias keyword list exceeding a preset number, remove a word according to a preset condition to maintain the size of the bias keyword list. For example, the word associated with the image data according to the preset condition may include a word associated with the image data overlapping with an existing word, a word having a high similarity with the word included in the speech data, an associated word that is most recently added to the bias keyword, a word having a low frequency, or the like.

The electronic apparatus may store the generated bias keyword list in the memory (operation 370). The electronic apparatus may perform a contextual automatic speech recognition (ASR) to recognize the speech data included in the contents using the stored bias keyword list and the trained language contextual model, and to convert the recognized speech data into text (operations 380, 470). The electronic apparatus may display the converted speech data as a caption. The electronic apparatus may capture speech data at a predetermined period and may display the speech data which is converted to text through synchronization with the captured speech data as a caption. According to an embodiment, the electronic apparatus may output speech data as a sound signal and may display "The player Michael is ready at the top of 5$^{th}$ inning of the game of AAA against BBB" (operation 480).

A process of respective operations of the electronic apparatus will be described below.

FIG. 5 is a diagram illustrating a process of identifying change of a scene according to an embodiment.

Referring to FIG. 5, a formula for calculating a mean square error (MSE) of a current frame and a formula for calculating a PSNR are illustrated. The electronic apparatus may capture a frame of image data at regular intervals and may identify whether the scene has changed. The electronic apparatus may calculate the MSE between the previously captured image and the currently captured image. The electronic apparatus may calculate a PSNR based on the calculated MSE.

The electronic apparatus may compare the calculated PSNR with a predetermined threshold value. The electronic apparatus may identify that the scene has been changed if the calculated PSNR exceeds a predetermined threshold value. If the scene is changed, the electronic apparatus may identify the object and the character from the image data based on the changed scene, and may display the converted speech data as a caption.

Figure 6A:
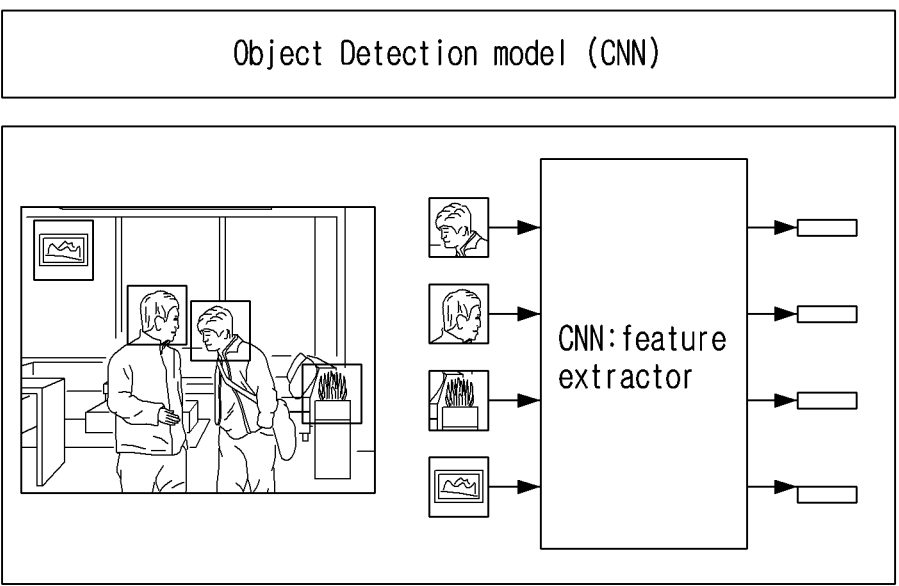
FIG. 6A is a diagram illustrating a process of identifying an object within an image according to an embodiment.
Figure 6B:
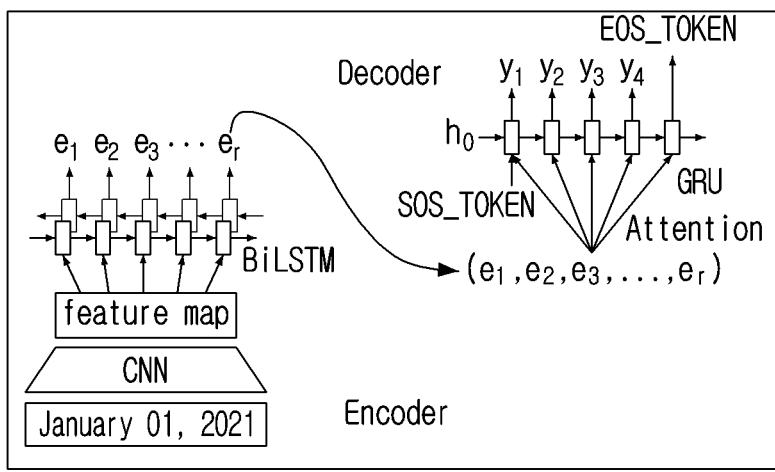
FIG. 6B is a diagram illustrating a process of identifying a character within an image according to an embodiment.

FIG. 6A is a diagram illustrating a process of identifying an object within an image according to an embodiment; FIG. 6B is a diagram illustrating a process of identifying a character within an image according to an embodiment. The disclosure will be described with reference to FIGS. 6A and 6B.

Referring to FIG. 6A, a process of extracting an object included in image data and identifying a name of an object is illustrated. The electronic apparatus may identify an object from a frame of image data. The electronic apparatus may extract features of the identified object using the learned object detection model and identify the object based on the extracted feature. The electronic apparatus may identify the name of the object using the trained object detection model. For example, the object detection model may be implemented with an artificial intelligence neural network such as a convolutional neural network (CNN), or the like.

Referring to FIG. 6B, a process of extracting a character included in the image data and identifying a character is illustrated. In one embodiment, the image data may include character "Jan. 1, 2021". The electronic apparatus may identify characters using the trained OCR model. In one embodiment, the OCR model may be a model generated by combining CNN, a long short-term memory (LSTM), and an attention technique. The electronic apparatus may extract a word (keyword) from the image data by using an artificial intelligence (AI) neural network and the AI technology shown in FIGS. 6A and 6B.

Figure 7:
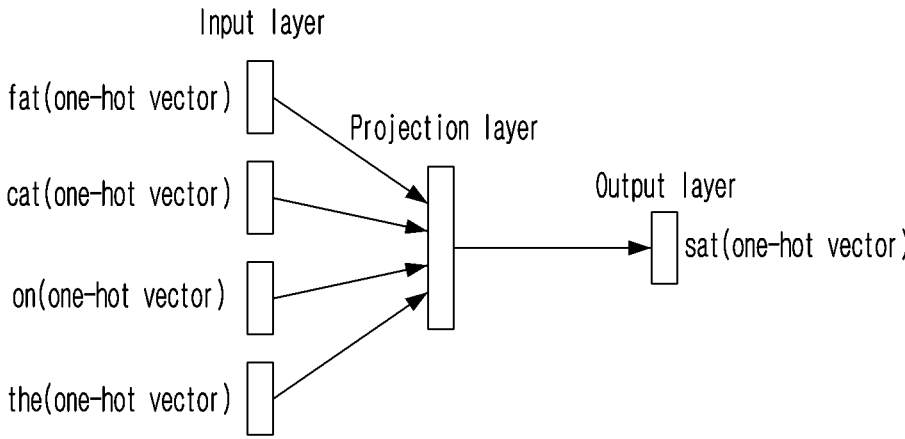
FIG. 7 is a diagram illustrating a latent semantic mapping process according to an embodiment.

FIG. 7 is a diagram illustrating a latent semantic mapping process according to an embodiment.

The electronic apparatus may perform a keyword extension process on the word extracted from the image data. For example, the electronic apparatus may, by using a model (e.g., word2vec, etc.) for performing latent semantic mapping for various corpus, add words that appear frequently as well as words having a similar meaning with the extracted words, as keywords. The electronic apparatus may reduce the total keywords by deleting words that have already been frequently appeared in the training set of the language contextual model or words with high frequency.

According to one embodiment, the latency semantic mapping model using the Word2vec model may be a trained 1-projection-layer model in which the embedding vector of one word may be represented by a linear combination with an embedding vector of the associated words. For example, similar related words (e.g., fat cat sat on the/fat cat sit on the) may be naturally collected anywhere close in the vector space. The Word2vec model is a model capable of inferring similar words and related words with a very small amount of computation. For example, one-hot vectors (in which all bits are "0" except one "1") that respectively correspond to the input words (e.g., "fat," "cat" "on" and "the") are fed to an input layer of the latency semantic mapping model, to be processed through a projection layer.

The electronic apparatus may generate a bias keyword list including words identified from the image data through the above-described process. When the electronic apparatus receives the speech data, the electronic apparatus may recognize the voice by using the trained AI model and may convert the voice into text. For example, the AI model recognizing voice may include a contextual RNN-T or C-LAS model, or the like. A general speech recognition artificial intelligence model may recognize speech in a manner of extracting a next word of the recognized word based on the input speech data. As described above, when an unlearned word is input, the general speech recognition AI model may predict and recognize the word as a previously trained. As an embodiment, a general speech recognition AI model may recognize a human name of "Patrick" as "pattern", "patriot", and the like, which are previously trained. Accordingly, the disclosure may recognize speech by combining a list of bias keywords with a general speech recognition artificial intelligence model. The electronic apparatus may generate a bias keyword list including the word "Patrick" through the above-described process from the image data. The electronic apparatus may identify words having a similarity of greater than or equal to a preset value with the words included in the bias keyword list among the inputted speech data as words included in the bias keyword list. According to an embodiment, if a human name "Patrick" is inputted to the electronic apparatus, the electronic apparatus may predict and recognize "Patrick" based on words included in the bias keyword list. The electronic apparatus may accurately predict an unlearned word as well. The electronic apparatus may recognize a voice of the speech data based on a voice recognition artificial intelligence model in which the generated bias keyword list is combined, and convert the recognized voice into text. The electronic apparatus may display the speech data converted into the text as a caption.

Various embodiments of displaying a caption using image data information have been described. A control method of the electronic apparatus will be described below.

Figure 8:
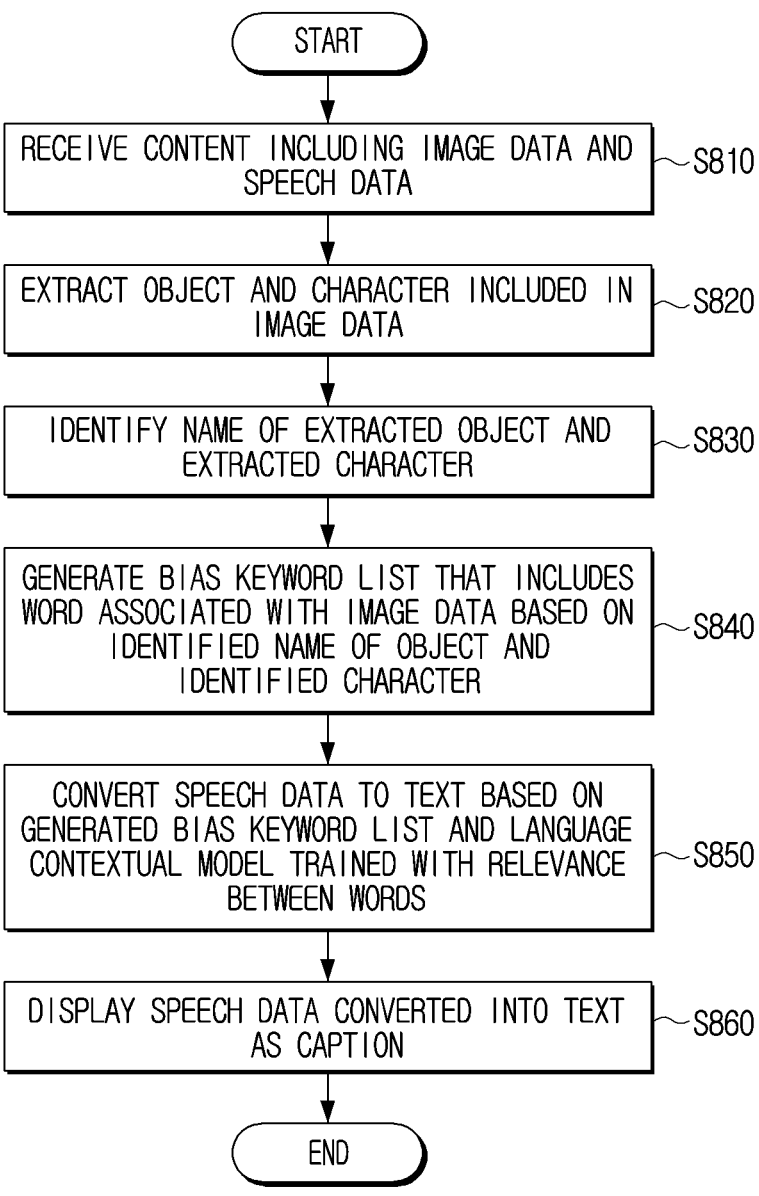
FIG. 8 is a flowchart illustrating a control method of an electronic apparatus according to an embodiment.

FIG. 8 is a flowchart illustrating a control method of an electronic apparatus according to an embodiment.

Referring to FIG. 8, the electronic apparatus may receive content including image data and speech data in operation S810, and the electronic apparatus may extract an object and a character included in the image data in operation S820. The electronic apparatus may, based on a peak signal to noise ratio (PSNR) of the frame of the image data exceeding a preset value, identify that a scene of the image data is changed. The electronic apparatus may extract an object and a character based on the frame having the scene changed.

For example, the electronic apparatus may extract objects and characters from each frame of image data.

The electronic apparatus may identify a name of the extracted object and the extracted character in operation S830. The electronic apparatus may extract features from the extracted object and may identify the name of the extracted object based on the extracted feature. For example, the electronic apparatus may identify the name of the object using the learned object detection model. The electronic apparatus may identify characters using the trained OCR model.

The electronic apparatus may generate a bias keyword list that includes the word associated with the image data based on the identified name of object and the identified character in operation S840. For example, the electronic apparatus may identify similarity by modeling a relationship between the identified name of the object and the identified character and generate the bias keyword list based on the identified similarity. Alternatively, the electronic apparatus may classify a word according to frequency, and may remove the word data having a frequency greater than or equal to a preset frequency and generate the bias keyword list. The electronic apparatus may, based on a number of words associated with the image data included in the generated bias keyword list exceeding a preset number, remove a word associated with the image data according to a preset condition. As an embodiment, the word associated with the image data according to the preset condition may include a word associated with the image data overlapping with an existing word, a word having a high similarity with the word included in the speech data, an associated word that is most recently added to the bias keyword, or a word having a low frequency.

The electronic apparatus may convert the speech data to a text based on the generated bias keyword list and a language contextual model trained with relevance between words in operation S850. For example, the electronic apparatus may identify, among the recognized speech data, a word having a similarity greater than or equal to a preset value with the word associated with the image data included in the bias keyword list, as a word associated with the image data, identify a word having the similarity less than a preset value as a word included in the trained language contextual model, to recognize speech included in the speech data. The electronic apparatus may convert the recognized speech data to text based on the identified word. The electronic apparatus may display the speech data converted into text as a caption in operation S860.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus comprising:
a communication interface;
a memory configured to store a language contextual model trained with relevance between words; and
a processor; and
wherein the processor is configured to:
receive content comprising image data and speech data through the communication interface,
extract any one of an object and a character included in the image data,
identify a word corresponding to the extracted any one the object and the character,
generate a keyword list comprising the identified word and a word with the identified word in similarity,
recognize the speech data,
identify, among the recognized speech data, a first word having a first similarity greater than or equal to a preset similarity value with at least one word in the keyword list, as a word associated with the image data,
identify, among the recognized speech data, a second word having a second similarity less than the preset similarity value with words in the keyword list, as a word included in a trained language contextual model,
convert the recognized speech data to text based on the first word, the second word, the generated keyword list, and the trained language contextual model, and
generate a caption information comprising the text.

2. The electronic apparatus of claim 1, wherein the processor is further configured to identify similarity by modeling a relationship between an identified name of the object and the character and generate the keyword list based on the identified similarity.

3. The electronic apparatus of claim 1, wherein the processor is further configured to classify a word associated with the image data according to frequency, and generate the keyword list by removing the word associated with the image data having a frequency greater than or equal to a preset frequency.

4. The electronic apparatus of claim 3, wherein the processor is further configured to, based on a number of words associated with the image data included in the generated keyword list exceeding a preset number, remove a word associated with the image data according to a preset condition.

5. The electronic apparatus of claim 4, wherein the word associated with the image data according to the preset condition comprises at least one of a word associated with the image data overlapping with an existing word, a word associated with the image data having a high similarity with the word included in the speech data, a word associated with the image data that is most recently added to the keyword, or a word associated with the image data having a low frequency.

6. The electronic apparatus of claim 1, wherein the processor is configured to extract any one of the object and the character from respective frames of the image data.

7. The electronic apparatus of claim 1, wherein the processor is further configured to extract a feature from the extracted object and identify a word of the extracted object based on the extracted feature.

8. The electronic apparatus of claim 1, wherein the processor is further configured to, based on a peak signal to noise ratio (PSNR) of frames of the image data exceeding a preset PSNR value, identify that a scene of the image data is changed.

9. A control method of an electronic apparatus, the control method comprising:
receiving content comprising image data and speech data through a communication interface of the electronic apparatus;
extracting any one of an object and a character included in the image data;
identifying a word corresponding to the extracted any one the object and the character;
generating a keyword list comprising the identified word and a word with the identified word in similarity;
recognizing the speech data;
identifying, among the recognized speech data, a first word having a first similarity greater than or equal to a preset value with at least one word in the keyword list, as a word associated with the image data;
identifying, among the recognized speech data, a second word having a second similarity less than the preset value with words in the keyword list, as a word included in a trained language contextual model;
converting the recognized speech data to text based on the first word, the second word, the generated keyword list, and the trained language contextual model; and
generating a caption information comprising the text.

10. The control method of claim 9, wherein the generating the keyword list comprises identifying similarity by modeling a relationship between an identified name of the object and the character and generating the keyword list based on the identified similarity.

11. The control method of claim 9, wherein the generating the keyword list comprises classifying a word associated with the image data according to frequency, and generating the keyword list by removing the word associated with the image data having a frequency greater than or equal to a preset frequency.

12. The control method of claim 11, wherein the generating the keyword list comprises, based on a number of words associated with the image data included in the generated keyword list exceeding a preset number, removing a word associated with the image data according to a preset condition.

13. The control method of claim 12, wherein the word associated with the image data according to the preset condition comprises at least one of a word associated with the image data overlapping with an existing word, a word associated with the image data having a high similarity with the word included in the speech data, a word associated with the image data that is most recently added to the keyword, or a word associated with the image data having a low frequency.

14. A non-transitory computer-readable recording medium having stored thereon instructions executable by at least one processor to perform operations comprising:

receiving content comprising image data and speech data through a communication interface of an electronic apparatus;

extracting any one of an object and a character included in the image data;

identifying a word corresponding to the extract any one the object and the character;

generating a keyword list comprising the identified word and a word with the identified word in similarity;

recognizing the speech data;

identifying, among the recognized speech data, a first word having a first similarity greater than or equal to a preset value with at least one word in the keyword list, as a word associated with the image data;

identifying, among the recognized speech data, a second word having a second similarity less than the preset value with words in the keyword list, as a word included in a trained language contextual model;

converting the recognized speech data to text based on the first word, the second word, the generated keyword list, and the trained language contextual model; and generating caption information comprising the text.

\*    \*    \*    \*    \*